(12) United States Patent
Broekaert et al.

(10) Patent No.: US 10,148,361 B2
(45) Date of Patent: *Dec. 4, 2018

(54) OPTICAL PAM MODULATION WITH DUAL DRIVE MACH ZEHNDER MODULATORS AND LOW COMPLEXITY ELECTRICAL SIGNALING

(71) Applicant: INPHI CORPORATION, Santa Clara, CA (US)

(72) Inventors: Tom Peter Edward Broekaert, Santa Clara, CA (US); Hari Shankar, Westlake Village, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,755

(22) Filed: Jan. 17, 2018

(65) Prior Publication Data

US 2018/0205464 A1 Jul. 19, 2018

Related U.S. Application Data

(63) Continuation of application No. 15/277,014, filed on Sep. 27, 2016, now Pat. No. 9,912,411, which is a
(Continued)

(51) Int. Cl.
*H04B 10/40* (2013.01)
*H04J 14/02* (2006.01)
(Continued)

(52) U.S. Cl.
CPC ......... *H04B 10/5161* (2013.01); *H04B 10/27* (2013.01); *H04B 10/272* (2013.01);
(Continued)

(58) Field of Classification Search
CPC .................... H04B 10/25753; H04B 10/1125
(Continued)

(56) References Cited

U.S. PATENT DOCUMENTS 6,490,069 B1 * 12/2002 Kahn ............... H04B 10/25137
398/183
7,380,993 B2 * 6/2008 Dallesasse ............ H04B 10/40
385/1
(Continued)

FOREIGN PATENT DOCUMENTS

KR 10-2010-0134046 A 12/2010

OTHER PUBLICATIONS

Next Gen PMD CFP MSA Baseline Specifications, Mar. 16, 2012, www.cfp-msa.org (Year: 2012).*
(Continued)

*Primary Examiner* — Oommen Jacob
(74) *Attorney, Agent, or Firm* — Richard T. Ogawa; Ogawa P.C.

(57) ABSTRACT

The present invention is directed to data communication system and methods. More specifically, various embodiments of the present invention provide a communication interface that is configured to transfer data at high bandwidth using PAM format(s) over optical communication networks. In various embodiments, amplitude and phase of the optical wave are modulated. There are other embodiments as well.

20 Claims, 5 Drawing Sheets

Related U.S. Application Data continuation of application No. 14/615,626, filed on Feb. 6, 2015, now Pat. No. 9,485,031, which is a continuation of application No. 13/833,415, filed on Mar. 15, 2013, now Pat. No. 8,983,291, which is a continuation-in-part of application No. 13/791,201, filed on Mar. 8, 2013, now Pat. No. 9,020,346.

(60) Provisional application No. 61/714,543, filed on Oct. 16, 2012, provisional application No. 61/699,724, filed on Sep. 11, 2012, provisional application No. 61/677,175, filed on Jul. 30, 2012.

(51) Int. Cl.
| | |
|---|---|
| *H04B 10/524* | (2013.01) |
| *H04B 10/27* | (2013.01) |
| *H04L 25/49* | (2006.01) |
| *H04L 27/34* | (2006.01) |
| *H04B 10/516* | (2013.01) |
| *H04B 10/272* | (2013.01) |
| *H04B 10/54* | (2013.01) |
| *H04L 7/00* | (2006.01) |
| *H04B 10/556* | (2013.01) |

(52) U.S. Cl.
CPC ........... *H04B 10/40* (2013.01); *H04B 10/524* (2013.01); *H04B 10/541* (2013.01); *H04L 7/0075* (2013.01); *H04B 10/5561* (2013.01)

(58) Field of Classification Search
USPC ............................................ 398/115, 116, 45
See application file for complete search history.

(56) References Cited

U.S. PATENT DOCUMENTS

| | | | | |
|---|---|---|---|---|
| 7,389,046 B1* | 6/2008 | Tanaka | ................ | H04J 14/0283 398/45 |
| 7,941,053 B2* | 5/2011 | Dallesasse | ............ | H04B 10/40 398/135 |
| 8,103,137 B2* | 1/2012 | Kirkpatrick | ........ | H04Q 11/0005 385/17 |
| 8,270,830 B2* | 9/2012 | Kirkpatrick | ........ | H04Q 11/0005 385/17 |
| 8,983,291 B1* | 3/2015 | Broekaert | ............ | H04B 10/524 398/45 |
| 9,485,031 B2* | 11/2016 | Broekaert | ............ | H04B 10/524 |
| 9,912,411 B2* | 3/2018 | Broekaert | ............ | H04B 10/524 |
| 2002/0078408 A1 | 6/2002 | Chambers et al. | | |
| 2002/0166091 A1* | 11/2002 | Kidorf | ................ | H03M 13/151 714/752 |
| 2003/0180041 A1* | 9/2003 | Azadet | ................ | H04B 10/503 398/25 |
| 2003/0180055 A1* | 9/2003 | Azadet | ................ | H04B 10/503 398/183 |
| 2003/0223762 A1* | 12/2003 | Ho | ....................... | H04B 10/541 398/186 |
| 2004/0171348 A1* | 9/2004 | Lin | ....................... | H04M 1/738 455/39 |
| 2006/0294443 A1 | 12/2006 | Fekih-Romdhane | | |
| 2008/0002985 A1* | 1/2008 | Shang | ................ | H04B 10/695 398/141 |
| 2008/0069570 A1* | 3/2008 | Dallesasse | ............ | H04B 10/40 398/139 |
| 2009/0047025 A1* | 2/2009 | Hong | ..................... | H04B 10/40 398/135 |
| 2009/0122904 A1* | 5/2009 | Jang | ....................... | H04L 25/028 375/286 |
| 2009/0154500 A1* | 6/2009 | Diab | ................. | H04L 12/40032 370/477 |
| 2010/0158530 A1* | 6/2010 | Soto | ....................... | H04B 10/40 398/79 |
| 2010/0254703 A1* | 10/2010 | Kirkpatrick | ........ | H04Q 11/0005 398/45 |
| 2010/0316391 A1* | 12/2010 | Shastri | ................. | H04B 10/801 398/141 |
| 2012/0148242 A1 | 6/2012 | Chen et al. | | |
| 2012/0250679 A1 | 10/2012 | Judge et al. | | |
| 2012/0275120 A1* | 11/2012 | Nguyen | ............... | G02B 6/4292 361/747 |
| 2013/0156425 A1* | 6/2013 | Kirkpatrick | .......... | H04B 10/801 398/45 |
| 2013/0259492 A1* | 10/2013 | Blakey | .................. | H04L 1/0045 398/208 |
| 2014/0169499 A1* | 6/2014 | Riani | ...................... | H04L 27/34 375/298 |
| 2014/0169789 A1* | 6/2014 | Bhoja | .................. | H04B 10/541 398/45 |

OTHER PUBLICATIONS

Office Action for U.S. Appl. No. 13/797,814, dated Apr. 3, 2014.
James F. Buckwalter et al., "A Monolithic 25-Gb/s Transceiver With Photonic Ring Modulators and Ge Detectors in a 130-nm CMOS SOI Process", IEEE Journal of Solid-State Circuits, Jun. 2012, pp. 1309-1322, vol. 47, No. 6.
International Search Report and Written Opinion for PCT/US2014/021436, filed Mar. 6, 2014.

* cited by examiner

QSFP

CFP4
5W

CFP2
8W

C Form-factor Pluggable (CFP)
12W

OPTICAL PAM MODULATION WITH DUAL DRIVE MACH ZEHNDER MODULATORS AND LOW COMPLEXITY ELECTRICAL SIGNALING

CROSS-REFERENCES TO RELATED APPLICATIONS

This patent application is a continuation of U.S. Nonprovisional patent application Ser. No. 15/277,014, filed Sep. 27, 2016, which is a continuation of U.S. Nonprovisional patent application Ser. No. 14/615,626, filed Feb. 6, 2015 and now granted as U.S. Pat. No. 9,485,031, issued Nov. 1, 2016, which is a continuation of U.S. Nonprovisional patent application Ser. No. 13/833,415, filed Mar. 15, 2013 and now granted as U.S. Pat. No. 8,983,291, issued Mar. 17, 2015, which claims priority to U.S. Provisional Patent Application No. 61/677,175, filed Jul. 30, 2012, and is a continuation-in-part (CIP) application of U.S. patent application Ser. No. 13/791,201, filed Mar. 8, 2013 and now granted as U.S. Pat. No. 9,020,346, issued Apr. 28, 2015, which claims priority from U.S. Provisional Patent Application No. 61/714,543, filed Oct. 16, 2012, and U.S. Provisional Patent Application No. 61/699,724, filed Sep. 11, 2012, all of which are incorporated by reference herein for all purposes.

BACKGROUND OF THE INVENTION

The present invention is directed to data communication systems and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication system and methods. More specifically, various embodiments of the present invention provide a communication interface that is configured to transfer data at high bandwidth using PAM format(s) over optical communication networks. In various embodiments, amplitude and phase of the optical wave are modulated. There are other embodiments as well.

It is to be appreciated that by using non-equispaced power levels and/or phase angles, various types of optical modulation can be achieved with low complexity electrical signaling. For example, PAM8 optical signals can be generated from PAM4 electrical signals according to embodiments of the present invention. Various embodiments of the present invention can be implemented with existing systems. For example, determination of power transmission levels and threshold levels can be performed by existing logic units and/or processors. There are other benefits as well.

DETAILED DESCRIPTION OF THE INVENTION

Figure 1:
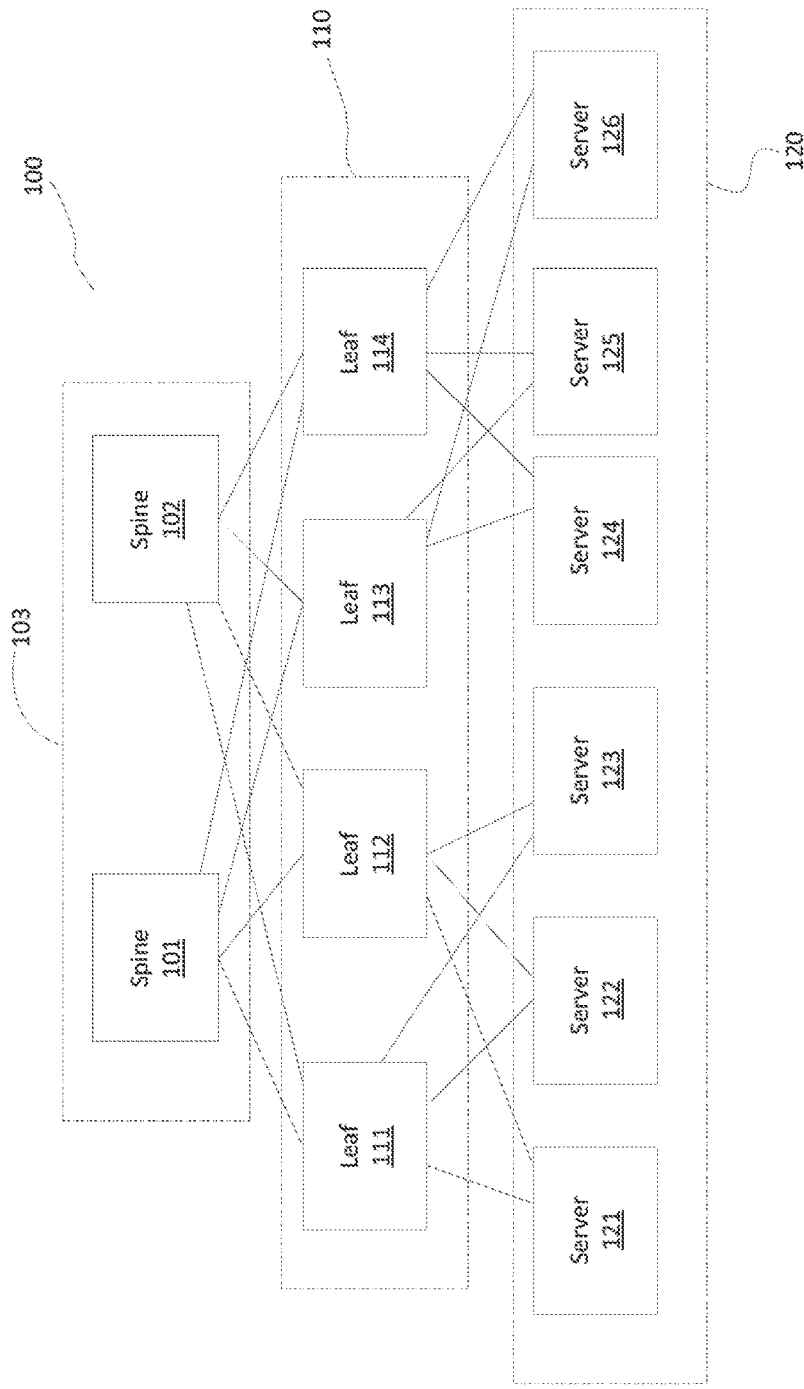
FIG. 1 is a simplified diagram illustrating a leaf-spine architecture 100 according to an embodiment of the present invention.

The present invention is directed to data communication system and methods. More specifically, various embodiments of the present invention provide a communication interface that is configured to transfer data at high bandwidth using PAM format(s) over optical communication networks. In various embodiments, amplitude and phase of the optical wave are modulated. There are other embodiments as well.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating a leaf-spine architecture 100 according to an embodiment of the present invention. This diagram is merely an example, which should not unduly limit the scope of the claims. One of ordinary skill in the art would recognize many variations, alternatives, and modifications. The leaf-spine architecture 100 comprises servers 120, leaf switches 110, and spine switches 103. It is to be appreciated that depending on the need and specific application, the number and arrangement of the servers and switches may be changed. As shown in FIG. 1, each server may be connected to more than one leaf switch. For example, server 121 is connected to leaf switches 111 and 112. Similarly, server 122 is connected to leaf switches 111 and 112, and so is server 123. In an exemplary embodiment, server 121 is connected to the leaf switch 111 via optical communication link utilizing pulse amplitude modulation (PAM). PAM2, PAM4, PAM8, PAM12, PAM16, and/or other variations of PAM may also be used in conjunction with optical communication links in various embodiments of the present invention. The bandwidth of the optical communication link between the server 121 and leaf switch 111 can be over 10 gigabits/s. Each leaf switch, such as leaf switch 111, may be connected to 10 or more servers. In one implementation, a leaf switch has a bandwidth of at least 100 gigabits/s.

In a specific embodiment, a leaf switch comprises a receiver device configured to receive four communication channels, and each of the channels is capable of transferring incoming data at 25 gigabits/s and configured as a PAM-2 format. Similarly, a server (e.g. server 121) comprises communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf switches are connected to spine switches. As shown in FIG. 1, each leaf switch is connected to spine switches 101 and 102. For example, leaf switch 111 is connected to the spine switch 101 and 102, and so are leaf switches 113 and 114. In a specific embodiment, each of the spine switches is configured with a bandwidth of 3.2 terabytes/s, which is big enough to communicate 32 optical communication links at 100 gigabits/s each. Depending on the specific implementation, other configuration and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

Figure 2:
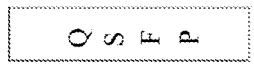
FIG. 2 is a simplified diagram illustrating the form factor of a communication device according to an embodiment of the present invention.
Figure 2:
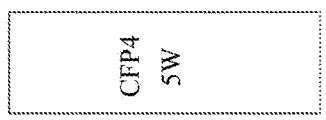
Figure 2:
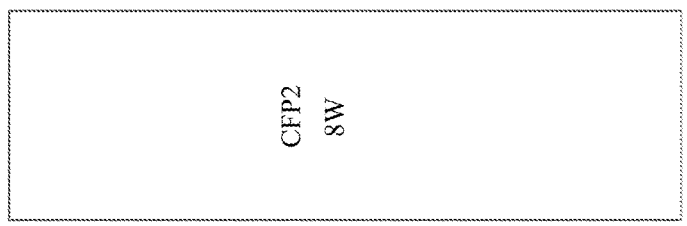
Figure 2:
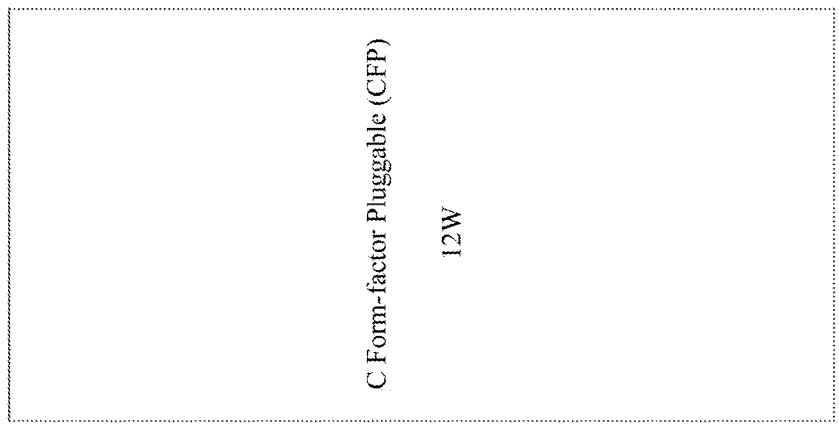

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices. FIG. 2 is a simplified diagram illustrating the form factor of a communication device according to an embodiment of the present invention. Today, C form-factor pluggable (CFP) standard is widely adapted for gigabit network systems. Conventional electrical-connection based CFP transceivers often use 10×10 gigabits/s lines to achieve high bandwidth. With optical connection, CFP transceivers can utilize 10×10 gigabits/s configuration, 4×25 gigabits/s configuration, or others. It is to be appreciated that by utilizing optical communication link and PAM format, a transceiver according to the present invention can have a much smaller form factor than CFP and CFP2 as shown. In various embodiments, communication interfaces according to the invention can have a form factor of CFP4 or QSFP, which are much smaller in size than the CFP. In addition to smaller form factors, the power consumption of communication interfaces according to the present invention can be much smaller. In a specific embodiment, with the form factor of QSFP, the power consumption can be as low as about 3 W, which is about ¼ that of convention transceivers with CFP form factor. The reduce level of power consumption helps save energy at data centers, where thousands (sometimes millions) of these communication devices are deployed.

Figure 3A:
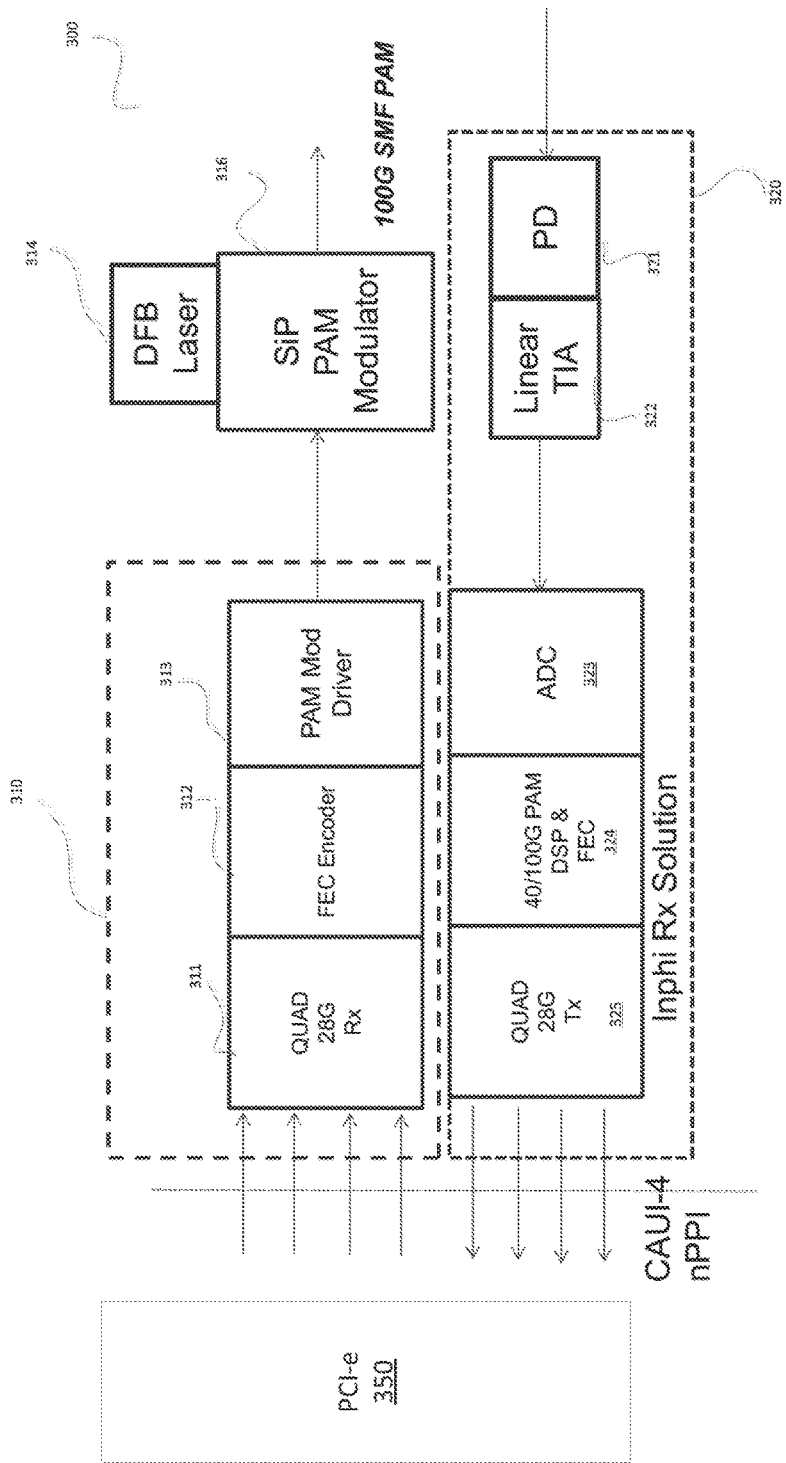
FIG. 3A is a simplified diagram illustrating a communication interface 300 according to an embodiment of the present invention.

FIG. 3A is a simplified diagram illustrating a communication interface 300 according to an embodiment of the present invention. This diagram is merely an example, which should not unduly limit the scope of the claims. One of ordinary skill in the art would recognize many variations, alternatives, and modifications. The communication interface 300 includes transmitter module 310 and a receiver module 320. The transmitter module 310 comprises a receiver 311, encoder 312, and PAM modulation driver 313.

In an embodiment, the communication interface 300 is configured to receive incoming data at through four channels, where each channel is configured at 25 gigabits/s and configured as a PAM-2 format. Using the transmitter module 310, modulator 316, and the laser 314, the communication interface 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 310 receives 4 channels of data. It is to be appreciated that other variants of pulse-amplitude modulation (e.g., PAM4, PAM8, PAM12, PAM16, etc.), in addition to PAM-2 format, may be used as well. The transmitter module 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 350. For example, the interface 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter module 310 further comprises an encoder 312. As shown in FIG. 3, the encoder 312 comprises a forward error correction (FEC) encoder. Among other things, the encoder 312 provides error detection and/or correction as needed. For example, the data received is in a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

The PAM modulation driver 313 is configured to drive data stream encoded by the encoder 312. In various embodiments, the receiver 311, encoder 312, and the modulation driver 313 are integrated and part of the transmitter module 310.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VCSEL) and others.

Figure 3B:
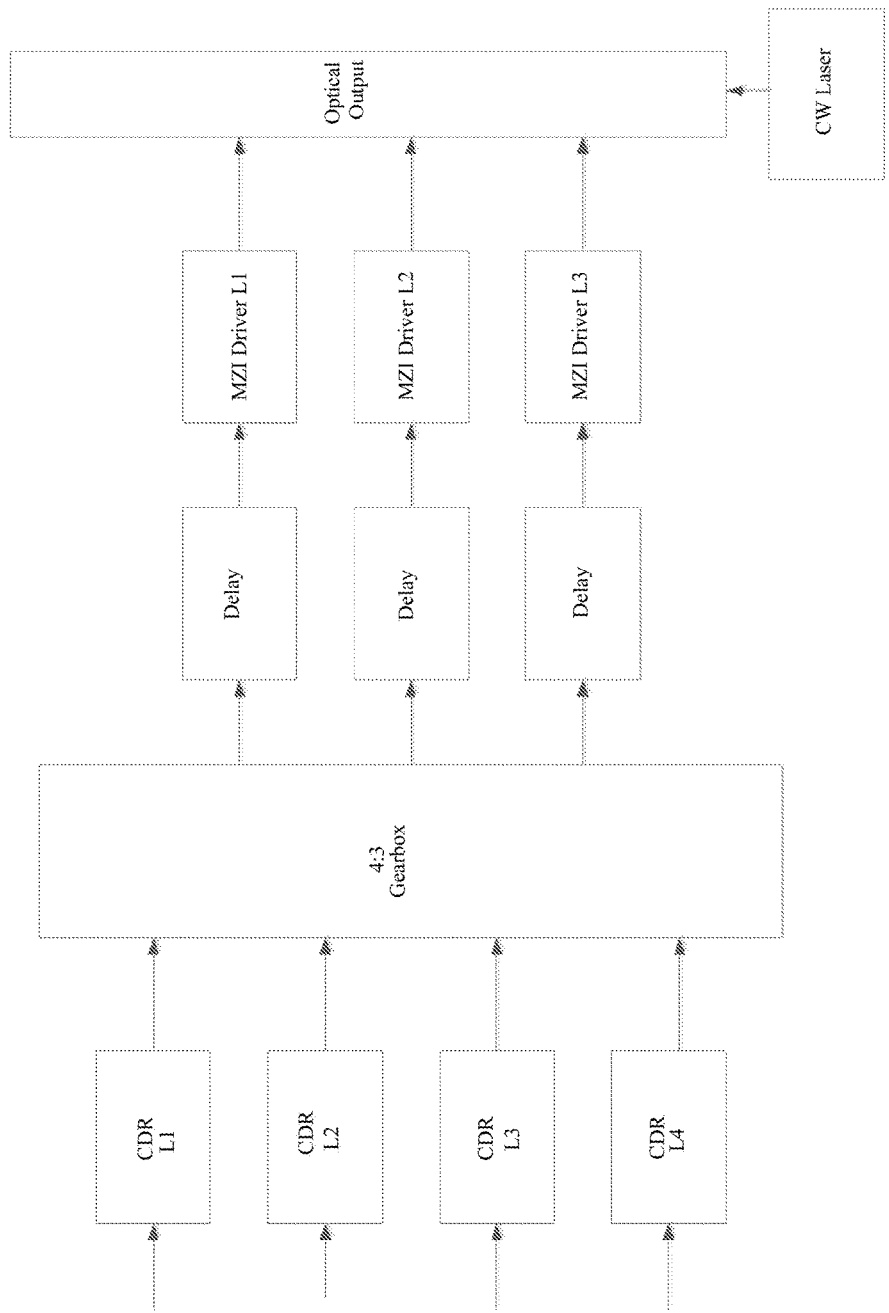
FIG. 3B is a simplified diagram illustrating a segmented optical modulator according to an embodiment of the present invention.

FIG. 3B is a simplified diagram illustrating a segmented optical modulator according to an embodiment of the present invention. This diagram is merely an example, which should not unduly limit the scope of the claims. One of ordinary skill in the art would recognize many variations, alternatives, and modifications. For example, modulated PAM signals modulated for transmission over optical communication links.

Now referring back to FIG. 3A. The communication interface 300 is configured for both receiving and transmitting signals. A receiver module 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

In operation, the communication interface 300 send optical signal to another communication interface. More specifically, the transmitter module of one network interface sends signals over optical network to the receiver module of another network interface. More specifically, electrical signals are modulated and converted to optical signals. For example, the PAM modulation driver 313 sends PAM modulated electrical signals to the PAM modulator 316, which, together with the laser source 314, sends modulated optical signals out. It is to be appreciated that modulated optical signals according to embodiments of the present invention are modulated both in amplitude and phase.

Figure 4:
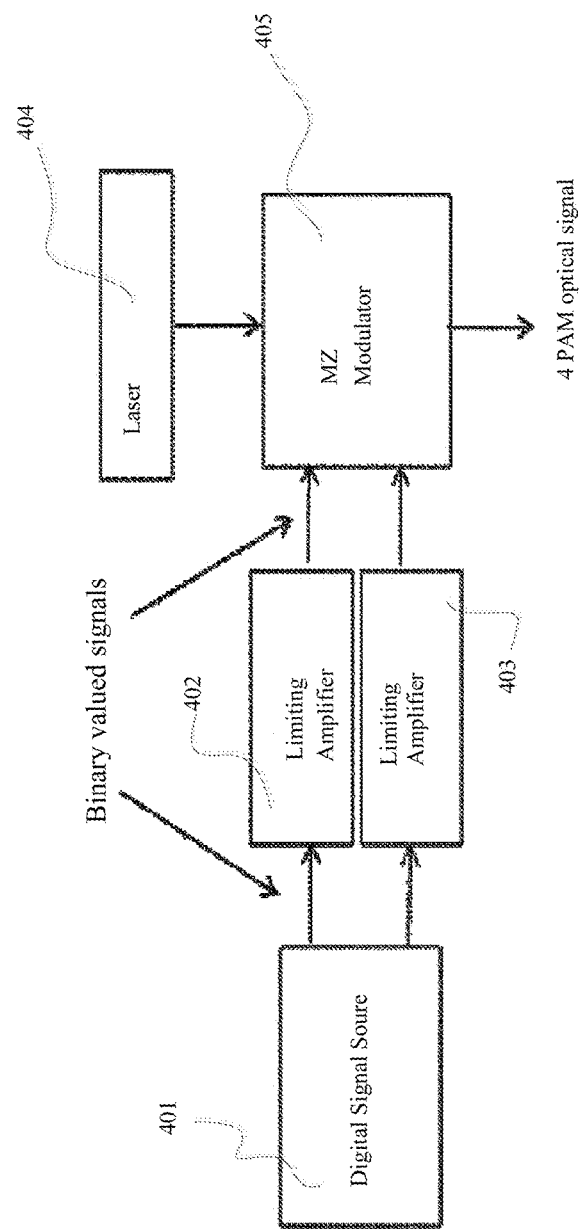
FIG. 4 is a simplified diagram illustrating optical modulation according to embodiments of the present invention.

FIG. 4 is a simplified diagram illustrating optical modulation according to embodiments of the present invention. This diagram is merely an example, which should not unduly limit the scope of the claims. One of ordinary skill in the art would recognize many variations, alternatives, and modifications. As shown in FIG. 4, the digital signal source 401 provides electrical signals. For example, the digital source 401 comprises the PAM modulation driver 313 shown in FIG. 3A. The electrical signals are in PAM format.

The output of the source 401, as shown, are binary valued signals. The output signals from the source 401 transmitted as a pair of signals as shown. The pair of signals are respectively processed by the limiting amplifiers 402 and 403, and provided to the modulator 405 as electrical modulating signals V1 and V2. The modulator 405, according to embodiments of the present invention, comprises a Mach Zehnder modulator. It is to be appreciated that other types of optical modulators may be possible as well.

In various embodiments, the modulator 405 comprises a dual drive Mach Zehnder modulator has 2 independent RF electrodes, which control the phase of the optical field in each arm of the modulator. For example, the resulting optical field at the output is given by the following equation:

$$E_o = 0.5 E_i \left( e^{j\left(\pi \frac{V_1}{V_\pi} + \phi_b\right)} + e^{j\left(\pi \frac{V_2}{V_\pi} - \phi_b\right)} \right)$$

where $E_i$ is the input optical signal to the MZ $E_o$ is the output optical signal of the MZ $V_1$ is the electrical modulating signal to one arm of the MZ $V_2$ is the electrical modulating signal to the other arm of the MZ $V_\pi$ is the voltage required to change the phase of the optical field by $\pi$ radians in the arm $\phi_b$ is a constant phase shift that can be adjusted by a dc bias voltage to the MZ For a dc bias voltage set at the quadrature point, i.e., $\phi_b = -\pi/4$, the output can be described be the following Equation:

$$E_o = E_i e^{j\left(\pi \frac{V_1 + V_2}{2 V_\pi}\right)} \sin\left(\pi \frac{(V_1 - V_2)}{2 V_\pi} + \frac{\pi}{4}\right)$$

The amplitude of the optical wave is modulated by the differential component of the modulating electrical signals and the phase is modulated by the common mode component of the modulating electrical signals.

It is to be appreciated that the modulation performed according to embodiments of the present invention is different from the conventional optical modulation in many ways. For example, conventionally the modulating signals used in optical communication systems are purely differential. For example, the input signals to the modulator is typically $V_1 = -V_2$, hence $V_1 + V_2 = 0$ and $$e^{j\left(\pi \frac{V_1 + V_2}{2 V_\pi}\right)} = 1.$$

As a result, the optical signal has only amplitude modulation. This is especially true of systems where the dispersion in the fiber is significant and any phase modulation of the optical signal will result in distortion as it propagates through the fiber.

The conventional modulations have certain implications in the complexity of the electrical signal required to generating a certain optical modulation format, namely, for generating an N-PAM optical signal, where an N-PAM electrical signal is required. This is shown in the following examples.

TABLE 1

2PAM with differential electrical signals

| $V_1/V_\pi$ | $V_2/V_\pi$ | $(\text{Mag}(E_o/E_i))^2$ | angle($E_0/E_i$) |
|---|---|---|---|
| 0.25 | −0.25 | 1 | 0 |
| −0.25 | 0.25 | 0 | 0 |

TABLE 2

4PAM with differential electrical signals

| $V_1/V_\pi$ | $V_2/V_\pi$ | $(\text{Mag}(E_o/E_i))^2$ | angle($E_0/E_i$) |
|---|---|---|---|
| 0.25 | −0.25 | 1.00 | 0.00 |
| 0.05 | −0.05 | 0.67 | 0.00 |
| −0.05 | 0.05 | 0.33 | 0.00 |
| −0.25 | 0.25 | 0.00 | 0.00 |

As shown in the tables above, a 2PAM electrical signal is needed to generate a 2PAM optical signal and a 4PAM electrical signal is needed to generate a 4PAM optical signal. In this case the magnitude of the electrical signals is adjusted so that the power levels of the optical signals are equally spaced. However the electrical signal levels can be adjusted to get any spacing in the optical signal.

For optical communication systems with low dispersion, such as links in the 1310 nm regime, the effect of dispersion due to any phase modulation on the signal is typically negligible. It is to be appreciated that a lower complexity electrical signal can be used to generate a N-PAM optical signal which will also have phase modulation on it. If the receiver disregards the phase and detects only the amplitude or power of the received signal, then the link is equivalent to a system with only amplitude modulation.

TABLE 3 an example for 4PAM

| $V_1/V_\pi$ | $V_2/V_\pi$ | $(\text{Mag}(E_o/E_i))^2$ | angle($E_0/E_i$) |
|---|---|---|---|
| 0.30 | −0.20 | 1.00 | 0.05$\pi$ |
| 0.30 | 0.20 | 0.67 | 0.25$\pi$ |
| −0.30 | −0.20 | 0.33 | −0.25$\pi$ |
| −0.30 | 0.20 | 0.00 | −0.05$\pi$ |

As shown in Table 3, each of the signals $V_1$ and $V_2$ take one of two values but of different amplitudes. The magnitude of the optical signal takes 4 equispaced values but its phase is not zero. If the receiver detects only the power of the optical signal and ignores the phase, the resulting system is a 4PAM system with a lower complexity electrical signal.

Another example for an 8PAM optical signal is next examined. The traditional method using an 8 PAM electrical signal for equispaced optical levels with no phase modulation is shown below in Table 4:

TABLE 4

| $V_1/V_\pi$ | $V_2/V_\pi$ | $(V_1 - V_2)/V_\pi$ | $(\text{Mag}(E_o/E_i))^2$ | angle($E_0/E_i$) |
|---|---|---|---|---|
| 0.25 | −0.25 | 0.50 | 1.00 | 0.00 |
| 0.13 | −0.13 | 0.25 | 0.86 | 0.00 |
| 0.07 | −0.07 | 0.14 | 0.71 | 0.00 |
| 0.02 | −0.02 | 0.05 | 0.57 | 0.00 |
| −0.02 | 0.02 | −0.05 | 0.43 | 0.00 |

TABLE 4-continued

| V1/Vπ | V2/Vπ | (V1 − V2)/Vπ | (Mag(Eo/Ei))^2 | angle(E0/Ei) |
|---|---|---|---|---|
| −0.07 | 0.07 | −0.14 | 0.29 | 0.00 |
| −0.13 | 0.13 | −0.25 | 0.14 | 0.00 |
| −0.25 | 0.25 | −0.50 | 0.00 | 0.00 |

In certain embodiments, two 4PAM electrical signals can also be used to generate an optical signal with the same 8 power levels but non zero phase, as shown in FIG. 5 below:

TABLE 5

| V1/Vπ | V2/Vπ | (V1 − V2)/Vπ | (Mag(Eo/Ei))^2 | angle(E0/Ei) |
|---|---|---|---|---|
| 0.32 | −0.18 | 0.50 | 1.00 | 0.07 π |
| 0.15 | −0.10 | 0.25 | 0.86 | 0.02 π |
| 0.32 | 0.18 | 0.14 | 0.71 | 0.25 π |
| 0.15 | 0.10 | 0.05 | 0.57 | 0.13 π |
| −0.15 | −0.10 | −0.05 | 0.43 | −0.13 π |
| −0.32 | −0.18 | −0.14 | 0.29 | −0.25 π |
| −0.15 | 0.10 | −0.25 | 0.14 | −0.02 π |
| −0.32 | 0.18 | −0.50 | 0.00 | −0.07 π |

It is to be appreciated that Further simplifications are possible in complexity of the electrical signals in this case but at the cost of sub optimal spacing between the optical levels. The following example, as illustrated in Table 6, shows an embodiment where one 4PAM electrical signal and a 2PAM electrical signal are used to generate the 8PAM optical signal. Due to the reduced number of electrical levels, the 8 optical levels cannot be picked independently. Here $V_1$ is a 2PAM signal and $V_2$ is a 4PAM signal.

TABLE 6

| V1/Vπ | V2/Vπ | (V1 − V2)/Vπ | (Mag(Eo/Ei))^2 | angle(E0/Ei) |
|---|---|---|---|---|
| 0.21 | −0.17 | 0.38 | 0.96 | 0.0175 π |
| 0.21 | −0.04 | 0.25 | 0.85 | 0.0815 π |
| 0.21 | 0.04 | 0.16 | 0.74 | 0.1255 π |
| 0.21 | 0.17 | 0.04 | 0.55 | 0.1895 π |
| −0.21 | −0.17 | −0.04 | 0.45 | −0.1895 π |
| −0.21 | −0.04 | −0.16 | 0.26 | −0.1255 π |
| −0.21 | 0.04 | −0.25 | 0.15 | −0.0815 π |
| −0.21 | 0.17 | −0.38 | 0.04 | −0.0175 π |

According to various embodiments, an optical signal with N (N even) power levels can be generated with 2 N/2 PAM electrical signals. For example, if N=N1*N2, then a N1-PAM and a N2-PAM electrical signal can be used to generate an optical signal with N power levels but the levels cannot be independently spaced. The levels of the electrical signals can however be optimized to minimize the error between the required and actual optical levels using some criteria such as LMS or min-max. For example, an optical signal with 16 power levels can be generated with 2 8-PAM electrical signals or also with 2 4-PAM electrical signals, but with suboptimal spacing.

In a specific embodiment, a 4PAM is scheme is provided. Under this scheme, the method leads to a simplified, efficient, and low power implementation of the transmitter. Specifically, a DAC or any other method of generating a multi-level amplitude electrical signal is not required. Since the electrical signals in this case are binary electrical signals of different amplitudes, a pair of limiting amplifiers with adjustable output amplitudes are sufficient to generate the optical 4PAM signal. Due to their limiting nature, the amplifiers can achieve improved signal to noise ratio and lower power than a corresponding linear amplifier that would be required for a 4PAM electrical signal.

It is to be appreciated that by using non-equispaced power levels and/or phase angles, various types of optical modulation can be achieved. For example, PAM8 optical signals can be generated from PAM4 electrical signals according to embodiments of the present invention. Various embodiments of the present invention can be implemented with existing systems. For example, determination of power transmission levels and threshold levels can be performed by existing logic units and/or processors. There are other benefits as well.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus comprising:
   a driver configured to generate from incoming data, electrical signal pairs representing information using non-equispaced power levels;
   a pair of limiting amplifiers with adjustable output amplitudes configured to amplify the electrical signal pairs; and
   a modulator configured to generate from a source, a modulated optical PAM signal based at least on a first electrical signal of the electrical signal pairs and a second electrical signal of the electrical signal pairs, wherein the apparatus has a CFP4 form factor or a QSFP form factor, wherein:
   the first electrical signal comprises a n-PAM signal, where n is an even integer; and
   the second electrical signal comprises a m-PAM signal, where m is an even integer different from n.

2. The apparatus of claim 1 wherein the apparatus has a QSFP form factor with a power consumption of about 3 W.

3. The apparatus of claim 1 wherein a sum of voltages of the first electrical signal and the second electrical signal is non-zero.

4. The apparatus of claim 1 wherein the electrical signal pairs comprise binary value signals.

5. The apparatus of claim 1 wherein m>n.

6. The apparatus of claim 1 wherein the modulator comprises a Mach Zehnder modulator.

7. The apparatus of claim 6 wherein the Mach Zehnder modulator comprises two independent RF electrodes.

8. The apparatus of claim 1 wherein the first electrical signal is characterized by a different phase angle from the second electrical signal.

9. The apparatus of claim 1 wherein the first electrical signal is characterized by a non-zero phase.

10. An apparatus comprising:
    a communication device configured to transmit modulated optical signals, the device comprising:
    a driver configured to generate from incoming data, electrical signal pairs characterized by a non-zero phase difference;
    a pair of limiting amplifiers with adjustable output amplitudes configured to amplify the electrical signal pairs; and
    a modulator configured to generate a modulated optical signal based at least on a first electrical signal and a second electrical signal of the electrical signal pairs, wherein:

the first electrical signal comprises a first nPAM signal, n being an even integer, the second electrical signal comprises a second nPAM signal, and the modulated optical signal comprises an (2n)PAM optical signal;

wherein the communications device apparatus has a CFP4 form factor or a QSFP form factor; and a server coupled to the communication device.

11. The apparatus of claim 10 wherein the communications device has a QSFP form factor with a power consumption of about 3 W.

12. A network system comprising:
a communication device configured to transmit modulated optical signals, the device comprising:
  a PAM driver configured to generate electrical signal pairs including a first electrical signal and a second electrical signal, the electrical signal pairs representing information using non-equispaced power levels;
  a pair of limiting amplifiers with adjustable output amplitudes configured to amplify the electrical signal pairs; and
  a modulator configured to generate an optical signal by modulating a light source based at least on the first electrical signal and the second electrical signal, wherein:
    the first electrical signal comprises a n-PAM signal, where n is an even integer; and
    the second electrical signal comprises a m-PAM signal, where m is an even integer different from n;
  wherein the communications device apparatus has a CFP4 form factor or a QSFP form factor; and
a server apparatus coupled to the communication device.

13. The system of claim 12 wherein the communications device has a QSFP form factor with a power consumption of about 3 W.

14. The system of claim 12 further comprising a forward error correction encoder for generating coded data received as input by the PAM driver.

15. The system of claim 12 further comprising an optical link in the 1310 nm regime.

16. The system of claim 12 wherein the modulator is coupled to a DC source.

17. The system of claim 12 wherein the electrical pairs comprise a differential pair.

18. The system of claim 12 wherein the server apparatus comprises part of a leaf spine architecture.

19. The system of claim 12 wherein the electrical signal pairs are characterized by a non-zero phase difference.

20. The apparatus of claim 10 wherein the modulator comprises a Mach Zehnder modulator.

* * * * *